Aug. 13, 1940.                    J. M. PEARSON                    2,211,158
                           METHOD FOR ORIENTING CORES
                  Original Filed Nov. 5, 1937      2 Sheets-Sheet 1

WITNESS:

INVENTOR
John M. Pearson
BY
Busser & Harding
ATTORNEYS.

Aug. 13, 1940.  J. M. PEARSON  2,211,158

METHOD FOR ORIENTING CORES

Original Filed Nov. 5, 1937  2 Sheets-Sheet 2

WITNESS:
Robt R Kitchel

INVENTOR
John M. Pearson
BY
ATTORNEYS.

Patented Aug. 13, 1940

2,211,158

UNITED STATES PATENT OFFICE 2,211,158

METHOD FOR ORIENTING CORES

John M. Pearson, Swarthmore, Pa., assignor to Sperry-Sun Well Surveying Company, Philadelphia, Pa., a corporation of Delaware Original application November 5, 1937, Serial No. 172,988. Divided and this application September 13, 1938, Serial No. 229,645

6 Claims. (Cl. 175—183)

This invention relates to a method and apparatus for orienting cores by the determination of the magnetic characteristics thereof.

This application is a division of my application Serial No. 172,988, filed November 5, 1937.

As described, for example, in Herrick Patent No. 1,792,639, dated February 17, 1931, it is possible to determine to a fair degree of accuracy the dip and strike of strata penetrated by a bore hole if measurements are made to ascertain the magnetic polarization of a core taken at the location of the strata.

The assumption borne out by observations is that in a magnetically polarized core the axis of polarization generally originally coincided in direction and sense with the earth's field and that in a core showing an axis of maximum susceptibility, that axis originally coincided in direction with the axis of the earth's field, though in the latter case the susceptibility axis is without sign.

In making such determinations, the magnetic polarity or axis of maximum susceptibility of the core may be determined by means of an apparatus of the type generally disclosed in said Herrick patent, which, briefly stated, constitutes a magnetometer capable of determining the magnetic north or susceptibility axis of the core. The magnetic polarity or susceptibility axis is marked on the core following the use of such apparatus, and by suitable measurements there can be then determined the apparent dip and strike of a bedding plane appearing in the core with respect to the magnetic north or susceptibility axis so indicated. Further calculations to determine the relation of dips and strikes to the earth may then be made, either numerically or by use of an apparatus such as that disclosed in my application Serial No. 146,739, filed June 7, 1937.

The present invention has two broad objects, first the improvement of apparatus for better determining the magnetic properties of cores and second an improved method of making determinations with such apparatus (including preparation of cores) whereby more thorough analysis of the magnetic properties of cores may be made than by methods heretofore used.

The improved apparatus may be briefly outlined as comprising an astatic magnet system, adjacent which the core may be mounted for slow rotation, together with a photographic recording means whereby movements of the astatic magnet system may be accurately recorded over a substantial period of time, the core rotating on its axis quite slowly in view of the delicacy and consequent long period of the magnet system. The objects of the invention relating to the apparatus are particularly concerned with various arrangements and details whereby the determinations may be carried out with a high degree of accuracy and particularly without influence due to extraneous magnetic fields. The invention also contemplates the provision in the apparatus of means for accurately supporting the core so as to provide for repeated observations consistent with each other. The accomplishment of these and other objects relating to the apparatus will become clear from the description which follows.

The primary object of the invention with respect to the method is to carry out measurements of the magnetic properties of cores in such fashion that the various magnetic properties may be individually determined and segregated from each other. In most cores it may be suspected that the magnetic properties might result first from definite polarization, secondly from a more or less uniform condition of anisotropic susceptibility which may exhibit itself as a general axis for the whole core and anistropic susceptibility or polarization conditions, or both, resulting from local inclusions in the core of materials having magnetic properties differing substantially from the properties of the major portions thereof. If such a core is rotated about its axis through a single revolution below a suspended astatic magnetic system in which the axes of the magnets are generally parallel to the axis of the core, the deflection of the magnetic system as recorded on a sensitized paper in the type of apparatus herein described will be an irregular line probably having more or less sinusoidal form. Such a line constitutes a rather uninterpretable record of the sum of the various properties of the core. In accordance with the present invention a second record is made by turning the core end for end and rotating it under the magnetic system, preferably (for simplicity of graphical calculation) in a direction opposite its former rotation. There is thus obtained another curve which, in general, may have little resemblance to the one first obtained. From the two curves, however, polarization effects may be readily segregated from the effects of anisotropic susceptibility, and in each of the subdivisions of these effects there may be rather readily segregated those portions of the effects which are of interest from those which are strictly characteristic of the particular core and not of interest. This latter analysis is particularly true if runs are made on a series of cores taken close to each other in the same portion of the bore hole. Furthermore, by taking proper precautions in making the determinations, other matters of interest are deducible.

The various objects of the invention relating to the preparation of cores and the making of determinations and details of both methods and apparatus will be apparent from the following description read in conjunction with the accompanying drawings in which:

Figure 6 is a diagrammatic illustration of an alternative method of making determinations; and Figure 7 is a vertical section illustrating one method of preparing cores for determinations.

Figure 1:
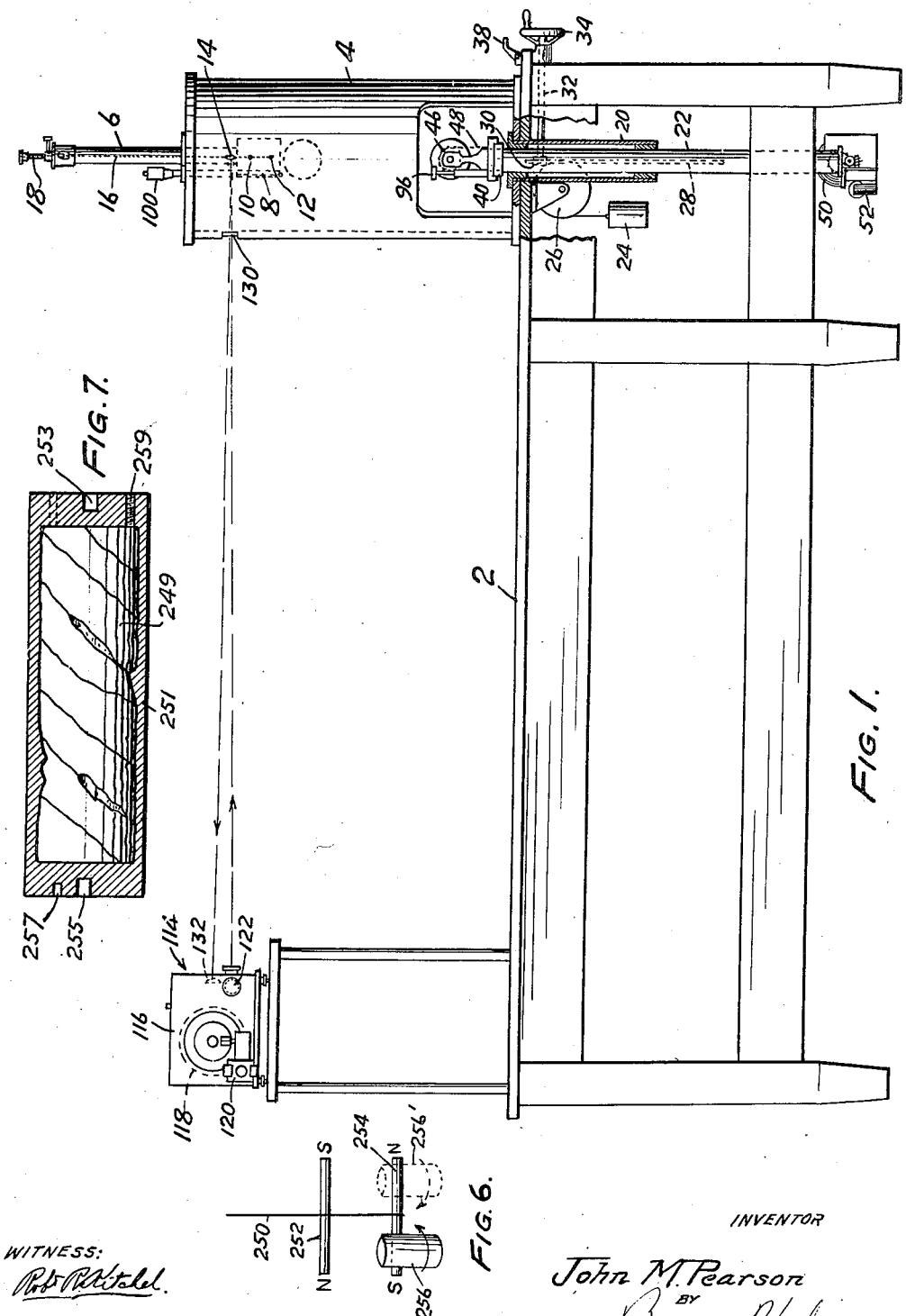
Figure 1 is a side elevation, partly in section, showing the general layout of the improved apparatus.

Referring first to Figure 1, the various portions of the apparatus are illustrated as supported upon a sturdy table 2 arranged to prevent vibration to a maximum degree, and preferably carefully leveled to properly support a magnetic system. The table carries a magnetic shield 4, for example, of steel of considerable thickness, provided with a window at its lower end of sufficient size to permit entry of a core and its holder. Fixed in the upper portion of this shield is a magnetometer housing 6 consisting of a torsion wire enclosing tube and a lower damping housing 8, both formed of non-magnetic material. Within this housing there is located a pair of bar magnets 10 and 12, of equal dimensions and supported upon a suitable mounting carrying a mirror 14, the whole structure being supported by a torsion wire 16 of suitable length adjustable about its axis by means, generally indicated at 18, of the type usually provided on sensitive galvanometers. Such suspensions for astatic magnetic systems are well known and need not be further described. Windows are provided in the housing 6 and the shield 4 opposite the face of the mirror.

Extending downwardly through the table is a tube 20 in which is slidably mounted a tube 22 carrying a core holder and counter-balanced by weights 24 supported by pulleys 26. A rack 28 carried by the tube 22 acts as a spline with respect to the bearing portions of the tube 20 to prevent rotation of tube 22 about its axis. The teeth of this rack mesh with a pinion 30 adapted to be driven by a hand wheel 34 through a shaft 32 arranged to be clamped in fixed position by clamping means 38. The parts just described are accurately arranged so as to definitely align a core carried by the holder with respect to the magnetic system.

The core holder, which is described in detail in the parent application above referred to, comprises means for holding a core and rotating it about an axis with its axis horizontally arranged. The core, mounted upon pins carried by rotary end members, is adapted to be driven through a sprocket 46 carried by one of the end members over which there is trained a chain 48, which extends downwardly through the table and passes about a sprocket 50 arranged to be driven by a motor 52 through reduction gearing. The core holder, which is removable from the upper end of the tube 22, is provided with an anvil 96, which may be adjusted to a definite height, preferably that of a horizontal plane tangent to the upper side of the core. When the core is located properly adjacent the magnetometer, the anvil 96 abuts the lower end of a micrometer 100. Thus, by the proper location of the anvil with respect to the core and the adjustment of the micrometer screw, the position of the core with respect to the magnetic needles is determined to a high degree of accuracy.

The recording camera is generally illustrated at 114. It comprises a light-tight box 116 in which is mounted a drum 118 arranged to receive a sheet of photographic paper which is clamped by a clamping member extending lengthwise of the drum. The drum is driven through reduction gearing by means of a synchronous motor 120 and its shaft is provided with an insulating disc 117 (Figure 2) carrying a conductor 121 adapted to engage and thereby connect with each other contact members 123.

Illumination for the magnetometer recording is provided by means of a lamp 122. A beam of light from the lamp is projected to the mirror 14 through an aperture in the box 116. A lengthwise extending opening is provided in the camera box and is adapted to be covered by a shutter, which is normally in position closing the box against the entrance of light. When a record is being made, this shutter is manually raised so that the beam may enter the box.

The optical system is of substantially conventional form. The beam of light emerging from the box 116 passes through a lens 130 to the mirror 14, by which it is reflected back through the lens 130 and through the slot in the box. The lens 130 is a cylindrical lens having its axis vertical and is of such focal length that the beam of light in traversing it twice would be focused to a very thin vertical line at the position of the paper on the drum 118. However, there is placed behind the slot in the box 116 a long cylindrical condensing lens 132 having a horizontal axis. This condensing lens is of short focal length and serves to reduce the thin vertically extending beam which impinges upon it to a fine and very intense point of light on the sensitized paper. As a result of this arrangement, it will be obvious that with the shutter closed there will appear on the scale of the shutter a vertical line, and adjustment may be made using this line as a guide to the condition of the instrument. When the shutter is open a corresponding point of light is projected upon the paper.

In the present application the various mechanical details involved in the apparatus and particularly in the driving of the core need not be described, but reference may be had to the parent application Serial No. 172,988, referred to above. Briefly stated the core is adapted to be driven by the synchronous motor 52 in opposite directions by means of a suitable clutching arrangement.

Figure 2:
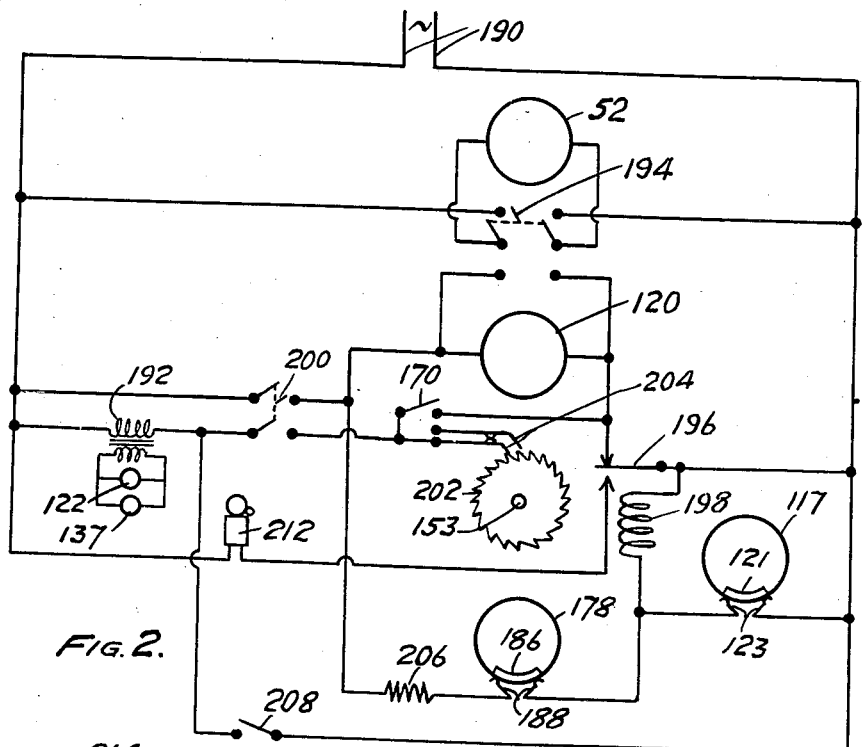
Figure 2 is a wiring diagram illustrating the inner connections between various portions of the apparatus.

Referring to Figure 2, it may be pointed out that driven with the gear there is a shaft 153 carrying a serrated wheel 202, adapted to make and break at 204 the circuit through transformer 192. Switch 204 is shunted by a switch 170 connected to a reversing lever (not shown). This arrangement is such as to produce interruptions in the illumination of elements 122 and 137 during reverse rotation but continuous illumination during forward rotation.

Rotated with the core there is a disc 178 of insulating material provided with a conductive segment 186 adapted to connect brushes 188. This arrangement is similar to that heretofore described and comprising the elements 121 and 123.

Power for the entire operating system is derived from an alternating current line 190. In view of the fact that both the core driving motor 52 and the camera driving motor 120 are synchronous motors driven from this same line, it is obvious that the rotation of the core and camera drum will accurately correspond. However, the core and the camera drum are not driven at the same rotary rate. When the core makes a complete revolution the camera drum turns through only 350°. In such fashion, a record corresponding to a complete rotation of the core is confined to a clear portion of the photographic paper on the camera drum, 10° be allowed for the overlapping and clamping of the paper thereon.

The contact members 186 and 121 of the discs 178 and 117, respectively, are arranged to correspond with each other to secure proper operation. The former, which may be designated the magnetometer limiting switch is so related to the contacts 188 as to short these contacts between 359° and 1° of a core revolution. The zero position of a core should correspond to a mid-position of this shorting contact. The camera limiting switch, on the other hand, is so arranged that the conductor 121 shorts the contacts 123 between 355° and 5° of the camera drum rotation.

The electrical relationships of the various parts will be generally clear from the wiring diagram of Figure 2 without detailed description. A double pole double throw switch 194 is so arranged that the motor 52 may be driven for adjustment and testing purposes independently of the motor 120 or simultaneously therewith, while both are under control of the relay contact 196, arranged to be opened through energization of the relay coil 198. When opening of the motor circuits takes place due to energization of the coil 198, a contact is made to energize a warning bell 212, which indicates to an attendant that the determination has been completed.

A transformer 192 supplies the low voltage for the energization of the lamp 122 and also for a lamp 137, which is arranged to produce a trace down one side of the photographic paper so as to give an indication of the proper position of the paper when interpretations are made. A switch 200 serves to control various circuits, as indicated.

The toothed cam member 202, previously mentioned, is adapted to control a quick make and break switch 204. The arrangement is such that during rotation of the cam member 202 contact is made for short periods and broken for still shorter periods so as to produce a dotted record on the photographic paper. The switch 170 is arranged to short the contacts 204 during a forward run, so that the record made during a forward run will be a continuous, unbroken line, while during a reverse run, a dotted line will be produced.

Additionally, on the wiring diagram there will be noted a protective resistance 206 and a switch 208 serving to energize the lamps 122 and 137 independently of the rest of the apparatus.

In the use of the apparatus, the core is first carefully prepared, for example, by having its cylindrical face turned down and its ends ground at right angles to its axis with due precaution to avoid the inclusion in the core of any magnetic materials, such as iron chippings, or the like. The core thus prepared is mounted in the holder and centered in predetermined position. There is marked on the core a zero indication from which angular reference about the axis may be made.

An alternative mode of preparation of the core for mounting in the apparatus is illustrated in Figure 7. It sometimes happens that cores as obtained from a core barrel are broken and may have rather irregular surfaces, breaks and hollows occurring along or adjacent to the lines of separation of the various strata. The cores in such cases may be rather fragile and even though major breaks are mended by the use of a magnetically neutral adhesive, such as casein glue, there may be danger of breakage if the core is subjected to turning and boring preparatory to mounting.

Additionally, there may be some question of demagnetization or magnetization in a strong electric field such as that of the earth if the core is subjected to much shock during its preparation. The turning accomplished by a grinding wheel may possibly affect its magnetic properties, and the same is true of the provision of holes at the ends for mounting purposes. These various difficulties may be avoided by encasing the core in a plaster of Paris cylinder in such fashion that the core itself is not subjected to any appreciable vibration. The core in such case, after cementing with glue, if that is necessary, may be sand blasted to remove from its surface any particles of magnetic materials which it may be carrying accidentally. The use of a sand blast, in view of the extremely small mass of the particles of sand, does not appreciably vibrate the core to such extent as to affect its magnetic properties. Following such sand blast, the core is set up on end upon three adjusting screws threaded into a baseboard. By the adjustment of these screws the axis of the core may be brought to accurate perpendicularity with respect to the base, whereupon it is surrounded concentrically by an internally smooth cylindrical mold and surrounded by plaster of Paris, which is permitted to set. The mold may then be removed and the adjusting screws threaded out of the plaster of Paris with the result that there remains a smooth cylindrical surface concentric with the axis of the core. The plaster of Paris ends may then be bored to receive the mounting and driving pins. Figure 7 illustrates a core 249 which is shown as involving various surface defects. This is surrounded by the case 251 of plaster of Paris, which is bored at 253, 255 and 257 to receive the mounting and driving pins. The screws on which the core was originally supported will leave holes, as indicated at 259, but these are of no consequence. The plaster of Paris is so soft that the mounting and driving holes may be formed therein without any substantial vibration of the core.

In making a determination the core is placed in its holder and adjustments made as described in said parent application to secure proper relative positioning of the camera and core and to insure that the record made by the magnetometer will be within the bounds of the camera. A zero line is preferably traced by hand rotation of the camera drum with the core lowered, switch 208 being closed.

With the switch 194 in its lower position, the switch 200 is closed, initiating the operation of the apparatus. At the time of this initiation of the operation, it will be noted that the contacts of both the magnetometer and camera limit switch will be closed. The contacts of the camera limit switch 117 short circuit the relay coil 198 so that the latter will not attract its armature 196 and the switch 200 will, therefore, initiate rotation of both motors 52 and 120 and will also energize the transformer 192, the switch 208 being open at this time. The resistance 206 prevents a short circuit of the line. Switch 123 opens the circuit before switch 188 opens its circuit, so that the operation is not stopped.

As the core rotates, the magnet system will be deflected causing a spot of light to move across the sensitized paper on the camera drum and thus trace a record. At the same time, the lamp 137 produces a mark serving to indicate the right side of the photographic record. The core is preferably very slowly driven in order that the magnets may follow it and in order that temporary jarring of the beam of light due to causes other than the magnetic conditions of the core will fail to record because the exposures corresponding to them will be very short. Since the dotting switch is shorted a solid line record will be made.

When the core has rotated 359° the contact 186 will bridge the contacts 188. At the same time, however, the contact 121 will not have bridged the contacts 123 because the camera will have rotated only about 349°. Accordingly, the relay 198 is energized, opening the motor and lamp circuits and at the same time energizing the warning bell 212. The operator will then close the shutter, thus ending the record of the forward run.

The core is then removed from its support, turned end for end, and replaced in the same position relative to the magnets as before, this position being determined accurately by the micrometer. The clutch arrangement is now shifted to secure a reverse rotation of the core and the core and camera drum are reset in their zero positions as before. Simultaneously with the shift to reverse rotation the switch 170 is opened. The shutter on the camera may now be raised and the switch 200 closed to provide a reversed rotation of the reversed core. The record at this time will be dotted by reason of the interruption of the lamp circuit by the switch 204, and consequently may be later distinguished from the record produced during the forward run. Automatic stopping takes place as before.

Figure 3:
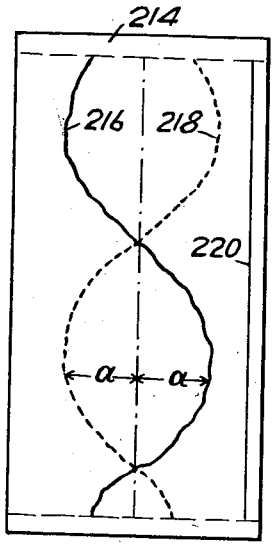
Figures 3, 4 and 5 are diagrams showing the types of records obtained in the apparatus and their mode of analysis.
Figure 4:
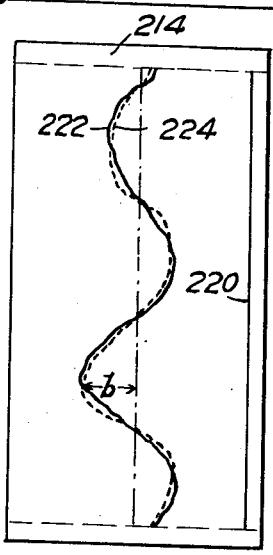
Figure 5:
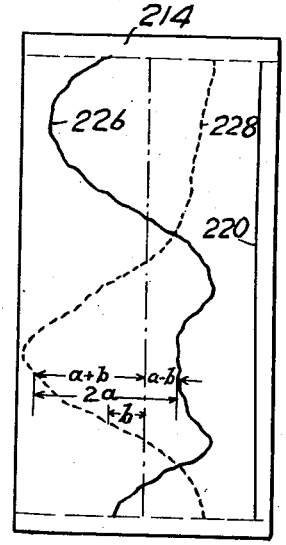

After development of the paper on the drum 118, the curves thereon may be interpreted to secure the desired information relative to the magnetic characteristics of the core. Figures 3, 4 and 5 indicate the types of records which may be obtained and their interpretation, though it will be understood that individual cores will show peculiar results in the curves made therefrom which may have special significance.

Consider first the record illustrated in Figure 3, made on a sheet 214. As illustrated, this record would be of the type obtained from a core showing polarization only and in which the polarization was fairly uniform. The record made during the forward run is indicated at 216 and that during the reverse run at 218. The line 220 is the line traced by the lamp 137 during both runs.

With a core of the type just mentioned the two curves will be substantially symmetrically located about the mean axis. Theoretically, if uniform polarization existed a smooth sinusoidal curve would result from both runs and the two would be identical in shape but located oppositely on the paper. The irregularities normally obtained are due to lack of symmetry in the polarization. If polarization alone is present, the curves will intersect each other at the central axis and will exhibit a single cycle on the record sheet.

Figure 4 illustrates the type of record which would be produced from an unpolarized core, but one exhibiting anisotropic susceptibility only. If the anisotropic susceptibility was of a uniform nature, exhibiting a definite axis throughout the core, the curve to be expected on a record such as that of Figure 4 would be a smooth sinusoidal curve consisting of two cycles on the length of the record. Furthermore, the records formed during the forward and reverse rotations would coincide. Actually, due to local irregularities, non-coincident records, as indicated at 222 and 224, will be produced, while, furthermore, the curve will not exhibit sinusoidal symmetry about its axis due to lack of symmetry of its anisotropic susceptibility about any axis.

The two records so far discussed are rather more theoretical than actual. Actually, both polarization and susceptibility are most likely to be present. To exhibit the type of record obtained in such a case, and in order to make it comparable with the others, there is illustrated in Figure 5 the type of record which would result if a single core had the polarization which would give rise to Figure 3 if it existed alone, and the anisotropic susceptibility which would give rise to Figure 4 if that existed alone. It will be noted that in the case of Figure 5, the forward and reverse curves 227 and 228 bear no recognizable relationship to each other. However, these two curves taken together may be interpreted to give separate information relative to polarization and anisotropic susceptibility. Consider, for example, the spacing of the curves transverse to their axis at any particular point, as, for example, at the point indicated in Figure 5 where this spacing is $2a$. One-half of this spacing, namely, $a$, is the corresponding deviation from the axis due to polarization. On the other hand, the quantity $b$, representing the deviation from the axis due to anisotropic susceptibility may be readily determined by noting the deviation from the axis of the center point of the line indicated at $2a$ in Figure 5. The figures will make clear how the two results superimpose to produce the record of Figure 5, and how that record may be analyzed to give the deviations due to the two causes. By plotting from Figure 5 the curves such as those in Figures 3 and 4, which are deducible from Figure 5, there may be obtained the still further information which may be derived from the irregularities and lack of symmetry of these curves. For example, a small inclusion of a particle of magnetic material may, if the material is polarized, exhibit itself by a sharp deviation from smoothness of either one or both of the derived curves.

Another way to express the above is to say that the algebraic difference of the curves is twice the polarization effect, and the algebraic sum of the curves is twice the susceptibility effect.

It will be noted that the careful marking of the core to indicate its zero position will enable the record to be correlated with the core in such fashion that there may be marked on the core or tabulated for it the various magnetic and susceptibility axes, and the like, which may be of interest for the purpose of interpreting the conditions of the sub-surface where the core was taken. Desirably, to determine conditions in any local region, a number of cores from that region should be examined so that in the interpretation only the factors common to that region may be given weight and proper disregard taken of the properties which are solely characteristic of the individual cores. As indicated above, the principal matter of interest is to determine the polarization axis or the axis of maximum susceptibility which may be deduced to lie in the general direction of the magnetic field of the earth. The orientation of strata shown in the cores may be deduced therefrom.

In Figure 6 there is illustrated an alternative arrangement for securing the type of information indicated above. In this case, the astatic magnetic system supported by a suspension wire 250 comprises magnets 252 and 254. A core 256, located as illustrated, with its axis substantially parallel to the axis of the suspension, may be rotated to produce a first trace on the record sheet. The core is then moved to the position indicated at 256' so that its axis is located at a distance from the axis of suspension the same as before with the core at the same vertical height with respect to the magnetic system and at the same distance as before from the lower magnet and similarly spaced from the opposite end of the magnet. If the core in the position 256' is on the same side of the magnet 254 as in the position 256, its rotation should be in the opposite direction to secure records of the types indicated in Figures 3 and 5. On the other hand, if it is on the opposite side of the magnet, its direction of rotation should be the same in both cases. Under these circumstances, the results will be of the same general type as those described heretofore, and a similar analysis may be made.

What I claim and desire to protect by Letters Patent is:

1. The method of determining the magnetic properties of cores from bore holes comprising rotating a core about its axis adjacent a suspended magnetic system with at least one end of said core adjacent one pole of the magnetic system, noting the deflections of said system during rotation of the core, again rotating the core about its axis adjacent to and similarly placed with respect to the suspended magnetic system but with said end of said core adjacent an opposite pole of the magnetic system, and again noting the deflections of said system during rotation of the core.

2. The method of determining the magnetic properties of cores from bore holes comprising rotating a core adjacent to a suspended magnetic system and about an axis perpendicular to the axis of suspension of said system, noting the deflections of said system during rotation of the core, changing the end for end relationship of the core and said system, again rotating the core about substantially the same axis perpendicular to the axis of suspension of said system, and again noting the deflections of said system during rotation of the core.

3. The method of determining the magnetic properties of cores from bore holes comprising rotating a core adjacent to a suspended magnetic system and about an axis perpendicular to the axis of suspension of said system, noting the deflections of said system during rotation of the core, changing the end for end relationships of the core and said system, rotating the core in the opposite direction about substantially the same axis perpendicular to the axis of suspension of said system, and again noting the deflections of said system during rotation of the core.

4. The method of determining the magnetic properties of core from bore holes comprising rotating a core about its axis adjacent a suspended magnetic system with at least one end of said core adjacent one pole of the magnetic system, the axis of the core being parallel to the axis of the magnetic system, noting the deflections of said system during rotation of the core, again rotating the core about its axis adjacent to and similarly placed with respect to the suspended magnetic system but with said end of said core adjacent an opposite pole of the magnetic system, and again noting the deflections of said system during rotation of the core.

5. The method of preparing a core from a bore hole for the determination of its magnetic properties, comprising including said core within a cylindrical cast of non-magnetic materials, with the axis of the core substantially coinciding with the axis of the cast.

6. The method of preparing a core from a bore hole for the determination of its magnetic properties, comprising including said core within a cylindrical cast of plaster of Paris, with the axis of the core substantially coinciding with the axis of the cast.

JOHN M. PEARSON.